US010216854B2

(12) United States Patent
Backhouse

(10) Patent No.: US 10,216,854 B2
(45) Date of Patent: Feb. 26, 2019

(54) OPTIMIZED PAGE SCRIPT DOWNLOADS IN A COMPONENT BASED ARCHITECTURE

(75) Inventor: Richard A. Backhouse, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 1642 days.

(21) Appl. No.: 11/828,884

(22) Filed: Jul. 26, 2007

(65) Prior Publication Data
US 2009/0031210 A1    Jan. 29, 2009

(51) Int. Cl.
*G06F 17/30* (2006.01)
*G06F 17/22* (2006.01)

(52) U.S. Cl.
CPC .............. *G06F 17/3089* (2013.01)

(58) Field of Classification Search
CPC ............ G06F 17/3089; G06F 17/2247; G06F 17/30896
USPC .................................................. 715/234, 744
See application file for complete search history.

(56) References Cited

U.S. PATENT DOCUMENTS

| | | | | |
|---|---|---|---|---|
| 5,721,824 A * | 2/1998 | Taylor | | 709/203 |
| 6,847,970 B2 * | 1/2005 | Keller et al. | | |
| 7,174,540 B2 * | 2/2007 | Ondrusek et al. | | 717/120 |
| 7,178,101 B2 * | 2/2007 | Tunning | | 715/236 |
| 7,228,500 B2 * | 6/2007 | Calvert | | G06F 17/212 |
| | | | | 709/203 |
| 7,254,814 B1 * | 8/2007 | Cormier | | G06F 9/44526 |
| | | | | 717/120 |
| 7,774,147 B1 * | 8/2010 | Manaev | | 702/35 |
| 2005/0015722 A1 * | 1/2005 | Niyogi et al. | | 715/517 |
| 2005/0086587 A1 * | 4/2005 | Balz | | G06F 17/243 |
| | | | | 715/221 |
| 2006/0212822 A1 * | 9/2006 | Facemire et al. | | 715/769 |
| 2006/0218511 A1 * | 9/2006 | Kapoor | | 715/854 |
| 2007/0101322 A1 * | 5/2007 | Muschett et al. | | 717/168 |
| 2007/0240111 A1 * | 10/2007 | Britton et al. | | 717/120 |
| 2007/0300244 A1 * | 12/2007 | Kieffer | | G06F 9/445 |
| | | | | 719/331 |

* cited by examiner

Primary Examiner — Manglesh M Patel
Assistant Examiner — Nicholas Hasty
(74) Attorney, Agent, or Firm — Steven M. Greenberg, Esq.; Shutts & Bowen LLP

(57) ABSTRACT

Embodiments of the present invention address deficiencies of the art in respect to module dependency loading in an Ajax environment, and provide a novel and non-obvious method, system and computer program product for the optimized downloading of Javascript in a component based architecture. In an embodiment of the invention, a method for optimized downloading of scripts in a component-based architecture can be provided. The method can include identifying a set of module dependencies for a script embedded in a page received for rendering, locating the module dependencies in a dependency graph for the script, determining from the dependency graph a subset of the module dependencies that have yet to be loaded for the page, requesting each module in the subset in a single request, and loading each requested module in conjunction with rendering the page.

8 Claims, 2 Drawing Sheets

OPTIMIZED PAGE SCRIPT DOWNLOADS IN A COMPONENT BASED ARCHITECTURE

BACKGROUND OF THE INVENTION

Field of the Invention

The present invention relates to the field of browser-server communications in a markup language document and more particularly to server calls from rendered markup in a content browser in browser-server communications.

Description of the Related Art

The conventional computing application incorporates program code executing in a computing platform on behalf of a single user. Larger computing environments enable network computing in which multiple end users distributed about a computer communications network access the same computing application. In regard to the latter, the client-server computing paradigm enables multiple instances of an application to execute within separate client computing platforms, each accessing a common data repository. By comparison, the centralized computing paradigm enables multiple end users to access a single instance of the application executing in a server environment through remote views to the server environment.

In the former circumstance, scaling a deployment of client-server technology can become a challenge as modifications to the underlying application require a complete distribution and installation of the modified application in each client computing platform. In contrast, in the latter circumstance, while scaling the deployment of a single application to many users can be a matter only of maintaining a single instance of the application, from a network connectivity perspective, maintaining a vast number of communicatively clients from an unpredictable number of geographic locations—especially outside of the comfort of the enterprise—can be a daunting task.

Content distribution networks provide a better approach to the wide scale deployment of application functionality to a limitless number of clients, irrespective of the platform from which clients access the application and without regard to the physical location of each of the clients. Commonly embodied in the form of a Web application content consuming clients can render a server provided user interface to an application while the server can support the storage and retrieval of application data and the logic associated with manipulating the application data. Importantly, data often is exchanged within the content distribution network according to a request-response model in which requests for data operations originate in the content browser and responses to the requests are provided by the server in the form of an update to the content rendered in the browser.

Notably, browser-server communications refer to the exchange of data between content browser within the client and content server in a content distribution network. Markup language distribution systems, namely, Web servers rely heavily upon browser-server communications to enable the functionality of Web based applications. Ordinarily, whenever an exchange of data is to occur between browser and server, a complete re-rendering of the Web page providing the front-end to the Web application is required. The constant refreshing of a Web page, however, can be distracting for an end user and can act as a barrier to the adoption of a Web application over a more conventional form of the application.

To address the page refresh problem, the Asynchronous Javascript and Extensible Markup Language (XML) technology, referred to by its acronym "Ajax", provides a ready way for the browser and server to exchange data without requiring page refreshing at every turn. In Ajax, Javascript asynchronous requests for data utilizing the XMLHttpRequest( ) (XHR) method allow for the exchange of small bits of information between browser and server instead of requesting entire pages incorporating the small bits of information. Advanced uses of the Ajax technology permit the implementation of complete Javascript frameworks within markup, such as the Dojo open source toolkit managed by the Dojo Foundation, so as to allow one to flexibly download Javascript modules without first providing script tags with "src" attributes for each Javascript module.

Specifically, Ajax has found particular application in the component based architecture of a Javascript framework to declare modules upon which Javascript depends. In this regard, an application programming interface (API) has been provided to permit the declaration of all modules upon which a specified Javascript depends resulting in the determination of whether each of the modules already has been loaded. For those modules not already loaded, XHR calls can be issued to the server from the browser to retrieve the unloaded albeit required modules. In a high latency environment, the repeated issuance of XHR calls to load a hierarchy of dependencies can result in tremendous delays in loading a Web page in the browser.

BRIEF SUMMARY OF THE INVENTION

Embodiments of the present invention address deficiencies of the art in respect to module dependency loading in an Ajax environment, and provide a novel and non-obvious method, system and computer program product for the optimized downloading of Javascript in a component based architecture. In an embodiment of the invention, a method for optimized downloading of scripts in a component-based architecture can be provided. The method can include identifying a set of module dependencies for a script embedded in a page received for rendering, locating the module dependencies in a dependency graph for the script, determining from the dependency graph a subset of the module dependencies that have yet to be loaded for the page, requesting each module in the subset in a single request, and loading each requested module in conjunction with rendering the page.

In one aspect of the embodiment, locating the module dependencies in a dependency graph for the script can include locating the module dependencies in an optimized form of the dependency graph for the script. In another aspect of the embodiment, requesting each module in the subset in a single request can include requesting each module in the subset in an XHR request. In yet another aspect of the embodiment, loading each requested module in conjunction with rendering the page further can include receiving each requested module and modifying the dependency graph to indicate that each requested module has been loaded for the page. Finally, in even yet another aspect of the embodiment, receiving each requested module can include receiving each requested module in a single response stream.

In another embodiment of the invention, a content distribution data processing system can include a content server executing in a server and configured to serve requested pages to requesting browsers. The pages can include scripts, each script including references to module dependencies. The system also can include optimized download code including a module loading supplement configured to hook a module loading call in the script, and a module initialization supplement configured to hook a module initialization call in the script. Finally, dependency graph generation logic can be coupled to the content server. The logic can include program code enabled to generate individual dependency graphs for respective ones of the scripts, and to attach to a requested page, each of a corresponding one of the dependency graphs and the optimized download code.

In one aspect of the embodiment, the program code of the dependency graph generation logic further can be enabled to generate an optimized form of each of the dependency graphs for attachment to the requested page. In another aspect of the embodiment, the optimized form of each of the dependency graphs is a Javascript Object Notation (JSON) form of each of the dependency graphs. Finally, in another aspect of the embodiment, each of the dependency graphs can include multiple different entries. Each of the entries can include a module index, a module identifier, a flag indicating whether or not an identified one of the modules has been loaded, and a reference to all direct child module dependencies. Optionally, the module index can be encoded with a quadrosexagesimal alphabet for application to a uniform resource locator (URL).

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for optimized page script downloads in a component-based architecture. In accordance with an embodiment of the present invention, a page incorporating script can be configured for distribution to one or more requesting browsers in a content distribution system. The page can be processed prior to distribution to identify module dependencies in the script and to assemble the dependencies into a dependency graph. Thereafter, when rendering the page in a receiving client, the dependency graph can be consulted to identify all of the modules yet to be loaded and to emit a single request for all of the identified modules. As each module is initialized, the dependency graph can be annotated to indicate that those modules which already have been downloaded. In this way, inefficiencies arising from multiple, granular download requests for dependent modules can be avoided.

Figure 1:
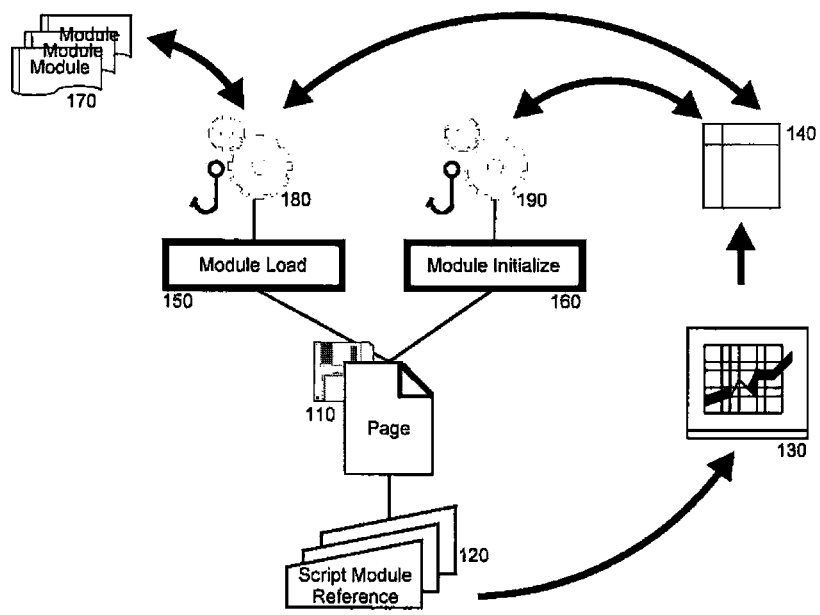
FIG. 1 is a pictorial illustration of a process for optimized page script downloads in a component-based architecture.

In illustration, FIG. 1 pictorially depicts a process for optimized page script downloads in a component-based architecture. As shown in FIG. 1, one or more script module references 120 can be incorporated in a script within a page 110. A dependency graph 130 can be constructed for the script module references 120 and the dependency graph 130 in turn can be optimized into a compact form 140, for instance a JSON structure. Thereafter, the page 110 can be distributed along with the compact form 140 to requesting content browsers. At the time of distribution, the script of the page 110 can be modified to hook the module loading call 150 for the script with module loading supplement 180, and to hook the module initialization call 160 for the script with module initialization supplement 190.

When loading the page 110 in the content browser, the module loading supplement 180 can parse the compact form 140 of the dependency graph 130 to determine which of the modules 170 in the script module references 120 already have been loaded and which remain to be loaded. For those of the modules 170 which remain to be loaded, the module loading supplement 180 can assemble a single list of those modules 170 to be incorporated in an XHR request to retrieve the modules 170 from the server. The server, upon receiving the XHR request, can return a single stream of the listed ones of the modules 170. As each of the modules 170 is initialized for use in the page 110, the module initialization supplement 190 can modify the compact form 140 of the dependency graph 130 to indicate that each of the modules 170 now has been loaded and need not be subsequently retrieved.

Figure 2:
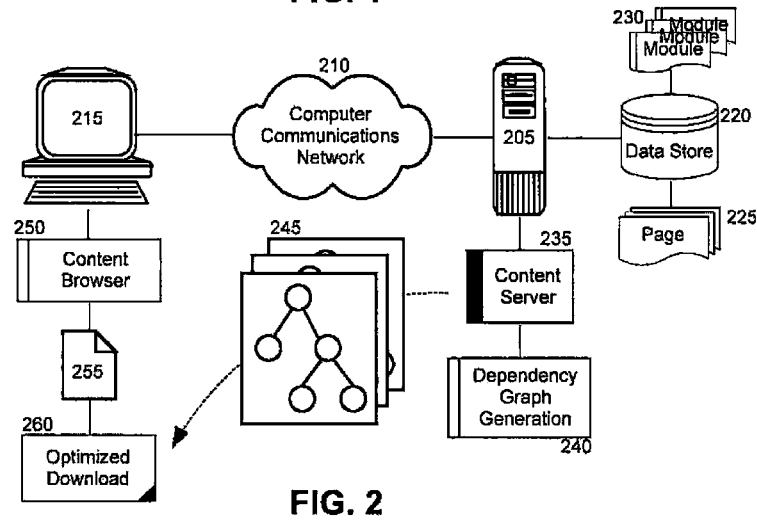
FIG. 2 is a schematic illustration of a page distribution data processing system configured for optimized page script downloads; and, FIG. 3 is a flow chart illustrating a process for optimized page script downloads in a component-based architecture.

The optimized page download process of FIG. 1 can be incorporated in a component based architecture defined within a page distribution data processing system. In illustration, FIG. 2 schematically depicts a page distribution data processing system configured for optimized page script downloads. As shown in FIG. 2, a host server 205 can be communicatively coupled to a client 215 over computer communications network 210. The host server 205 can include a content server 235 configured to serve pages 225 in data store 220 over the computer communications network 210 to client 215 for rendering in content browser 250. The pages 225 can include embedded script requiring logic embodied by modules 230. To that end, a page 255 rendered in content browser 250 can include references to the modules 230 for retrieval and loading at the time of rendering in the content browser 250.

Dependency graph generation logic 240 can be coupled to the content server 235. The dependency graph generation logic 240 can include program code enabled to parse the pages 225 containing script to generate respective dependency graphs 245 indicating dependencies amongst modules 230 referenced in the script of the pages 225. The program code of the dependency graph generation logic 240 further can be enabled to append optimized download code 260 to a served page 255 for which a respective one of the dependency graphs 245 has been generated. The optimized download code 260 can include supplemental logic to each of module loading code and module initialization code within the script of the served page 255.

In particular, the supplemental logic to the module loading code can process a corresponding one of the dependency graphs 245 to identify those of the modules 230 referenced within the page 255 which have yet to be loaded and to send a request to the content server 235 retrieve the yet to be loaded ones of the modules 230. The content server 235 in response can insert within a single stream all of the referenced ones of the modules 230. Once the inserted ones of the modules 230 are initialized, the supplemental logic to the module initialization code can modify the corresponding one of the dependency graphs 245 to indicate that initialized ones of the modules 230 have been loaded and need not be retrieved subsequently.

Figure 3:
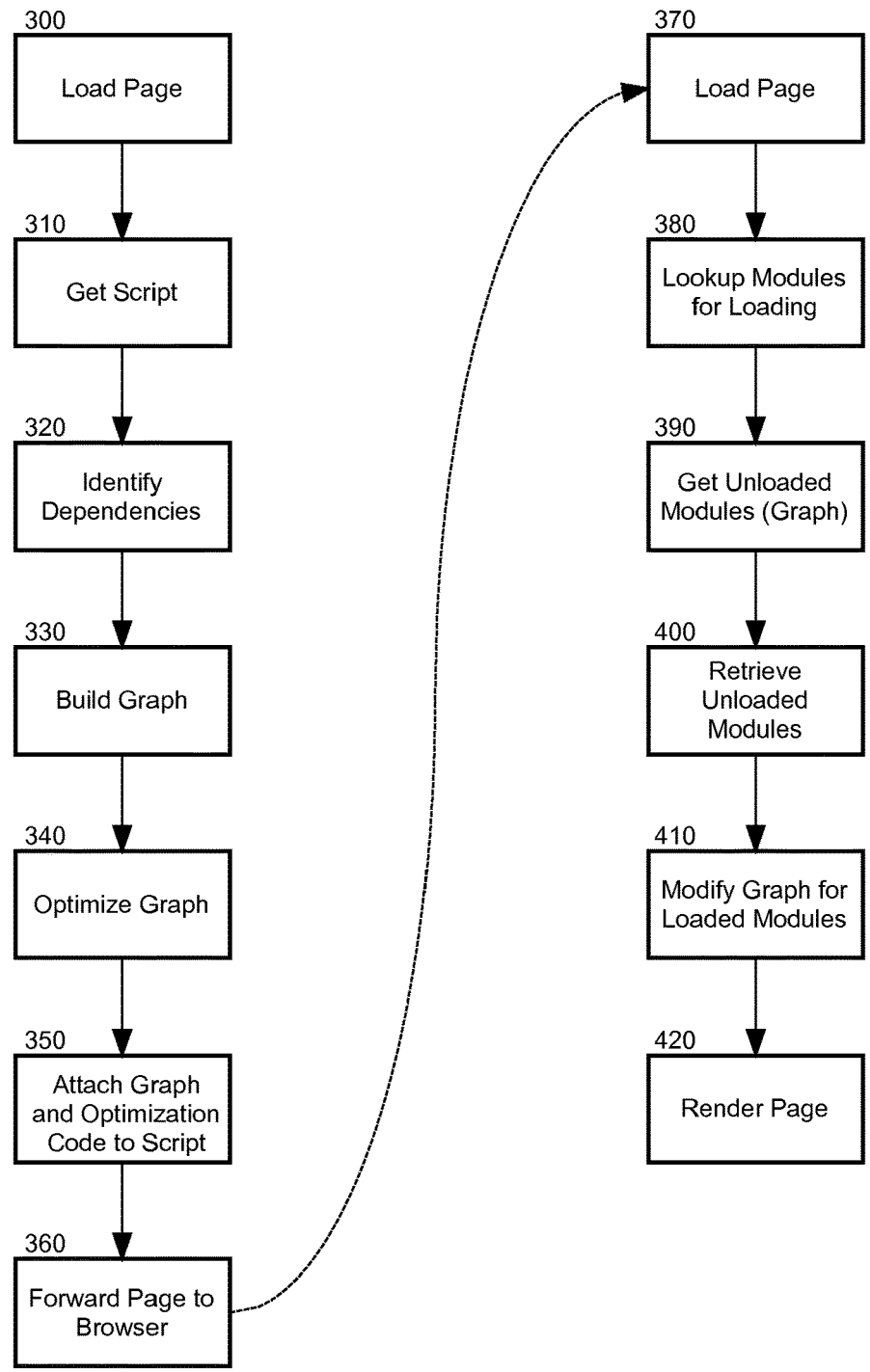

In yet further illustration of the operation of the optimized download code 260, FIG. 3 is a flow chart illustrating a process for optimized page script downloads in a component-based architecture. Beginning in block 300, a page intended for distribution from server to browser can be loaded for processing and in block 310, a script can be located within the page. In block 320 module dependencies for the script can be identified and in block 330 a dependency graph can be generated. Each node in the dependency graph can include a unique index, along with a module identifier, uniform resource indicator and a list of immediate child dependencies.

In block 340, the dependency graph can be optimized for size in JSON form with the indices being encoded with a quadrosexagesimal alphabet for application to a URL. Specifically, the optimized form of the dependency graph can include within each entry an encoded index, an array of encoded references to each direct child dependency, an indication of whether or not the indexed module has been loaded, an identifier for the indexed module and a URI to the indexed module. In block 350, the optimized form of the dependency graph can be attached to optimization code and distributed in block 360 with the page to a requesting browser.

In block 370, the page can be loaded in a requesting browser for rendering. In block 380, module dependencies for a script in the page can be identified and a lookup can be performed in the optimized form of the dependency graph. Thereafter, those of the modules which have yet to be loaded as indicated in the optimized form of the dependency graph can be requested from the server in a single XHR call in block 390. In block 400, the unloaded modules requested from the server can be retrieved from the server in a single response stream and each of the dependant modules can be initialized. In block 410, as each module is initialized, the entry for the module in the optimized form of the dependency graph can be modified to indicate that the module has been loaded. Thereafter, in block 420 the page can be rendered in the browser.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for optimized downloading of scripts in a component-based architecture, the method comprising:
   receiving in a Web browser for rendering, both a page including an embedded script and also a compact form of a dependency graph constructed for a multiplicity of Javascript modules upon which the script depends, the graph comprising one or more nodes, each node of the one or more nodes including a unique index, a module identifier referencing a corresponding one of the modules, a uniform resource indicator (URI), and a list of immediate child dependencies; and,
   hooking a module initialization call for the embedded script with a module initialization supplement, the module initialization supplement performing as the Web browser loads the page:
   parsing the compact form of the dependency graph received with the page to determine which of the modules already have been loaded and which of the modules remain to be loaded;
   assembling in a single list, those of the modules yet to be loaded to be incorporated in a request to retrieve the modules from the server and requesting each of the modules in the list in a single request;
   receiving from the server in a single stream the subset of the modules that have yet to be loaded;
   loading each of the modules in the subset in conjunction with rendering the page; and,
   modifying the compact form of the dependency graph to indicate that each of the modules has been loaded as each of the modules are initialized for use in the page.

2. The method of claim 1, wherein the requesting comprises requesting each of the modules in the list in a single extensible markup language (XML) hypertext transfer protocol (HTTP) request (XHR) request.

3. A content distribution data processing system comprising:
   a server computer comprising memory and at least one processor;
   a content server executing in the server computer and configured to serve a requested page to requesting browsers, the page comprising scripts, each script comprising a plurality of references to Javascript modules upon which the script depends;

optimized download code comprising a module loading supplement configured to perform at a time when the content server serves the requested page, hooking a module loading call in the script with a module initialization supplement, the module initialization supplement performing as the Web browser loads the page; and, dependency graph generation logic coupled to the content server, the logic comprising program code enabled to generate individual compact forms of respectively different dependency graphs for a multiplicity of Javascript modules upon which respective ones of the scripts depends, each of the individual compact dependency graphs comprising one or more nodes, each node of the one or more nodes including a unique index, a module identifier referencing a corresponding one of the modules, a uniform resource indicator (URI), and a list of immediate child dependencies, and to attach to a requested page, each of a corresponding one of the dependency graphs and the optimized download code, the program code further being enabled to optimize the dependency graph into a compact form and distributing the compact form of the dependency graph with the requested page to a requesting content browser.

4. The system of claim 3, wherein the optimized form of each the dependency graph is a Javascript Object Notation (JSON) form of the dependency graph.

5. The system of claim 4, wherein the optimized form of the dependency graph comprises a plurality of entries, each of the entries comprising a module index, a module identifier, a flag indicating whether or not an identified one of the Javascript modules has been loaded, a uniform resource identifier (URI) to the identified one of the Javascript modules, and a reference to all direct child module dependencies.

6. The system of claim 5, wherein the module index is encoded with a quadrosexagesimal alphabet for application to a uniform resource locator (URL).

7. A computer program product comprising a non-transitory computer usable medium embodying computer usable program code for optimized downloading of scripts in a component-based architecture, the computer program product comprising:

computer usable program code for receiving in a Web browser for rendering, both a page including an embedded script and also a compact form of a dependency graph constructed for a multiplicity of Javascript modules upon which the script depends, the graph comprising one or more nodes, each node of the one or more nodes including a unique index, a module identifier referencing a corresponding one of the modules, a uniform resource indicator (URI), and a list of immediate child dependencies; and, computer usable program code for hooking a module initialization call for the embedded script with a module initialization supplement, the module initialization supplement performing as the Web browser loads the page:

parsing the compact form of the dependency graph received with the page to determine which of the modules already have been loaded and which of the modules remain to be loaded;

assembling in a single list, those of the modules yet to be loaded to be incorporated in a request to retrieve the modules from the server and requesting each of the modules in the list in a single request;

receiving from the server in a single stream the subset of the modules that have yet to be loaded;

loading each of the modules in the subset in conjunction with rendering the page; and, modifying the compact form of the dependency graph to indicate that each of the modules has been loaded as each of the modules are initialized for use in the page.

8. The computer program product of claim 7, wherein the computer usable program code for the requesting comprises requesting each of the modules in the list in a single extensible markup language (XML) hypertext transfer protocol (HTTP) request (XHR) request.

* * * * *